(12) United States Patent
Xia et al.

(10) Patent No.: US 8,797,666 B2
(45) Date of Patent: Aug. 5, 2014

(54) ADAPTIVE MAXIMUM A POSTERIORI (MAP) DETECTOR IN READ CHANNEL

(71) Applicant: LSI Corporation, Milpitas, CA (US)

(72) Inventors: Haitao Xia, San Jose, CA (US); Lei Chen, Sunnyvale, CA (US)

(73) Assignee: LSI Corporation, San Jose, CA (US)

( * ) Notice: Subject to any disclaimer, the term of this patent is extended or adjusted under 35 U.S.C. 154(b) by 28 days.

(21) Appl. No.: 13/650,562

(22) Filed: Oct. 12, 2012

(65) Prior Publication Data

US 2014/0105266 A1   Apr. 17, 2014

(51) Int. Cl.
*G11B 20/10* (2006.01)

(52) U.S. Cl.
USPC .............................................. 360/39; 360/65

(58) Field of Classification Search
CPC .................................................. G11B 20/10287
See application file for complete search history.

(56) References Cited

U.S. PATENT DOCUMENTS

| 6,122,120 | A  | * | 9/2000 | Shimoda ........................ 360/46 |
| 7,173,783 | B1 | * | 2/2007 | McEwen et al. ................ 360/46 |
| 7,872,978 | B1 |   | 1/2011 | Marrow et al. |
| 8,014,094 | B1 | * | 9/2011 | Jin .................................. 360/31 |
| 2002/0073377 | A1 | * | 6/2002 | Patapoutian ................... 714/788 |
| 2002/0154712 | A1 | * | 10/2002 | Cideciyan et al. ............ 375/341 |
| 2004/0032683 | A1 | * | 2/2004 | Ashley et al. .................... 360/46 |
| 2005/0268211 | A1 | * | 12/2005 | Haratsch ........................ 714/796 |
| 2007/0234188 | A1 | * | 10/2007 | Shiraishi ........................ 714/794 |
| 2008/0159106 | A1 | * | 7/2008 | Immink et al. ............. 369/59.17 |
| 2009/0268575 | A1 | * | 10/2009 | Tan et al. .................... 369/53.41 |
| 2012/0207201 | A1 | * | 8/2012 | Xia et al. ....................... 375/232 |
| 2012/0236428 | A1 | * | 9/2012 | Xia et al. ......................... 360/32 |
| 2013/0235484 | A1 | * | 9/2013 | Liao et al. ....................... 360/39 |

OTHER PUBLICATIONS

Jamal Riani, "Near Minimum Bit-Error Equalizer Adaptation for PRML Systems", IEEE Transactions on Communications, Dec. 2007, p. 2316-2327, vol. 55, No. 12.

* cited by examiner

*Primary Examiner* — Peter Vincent Agustin
(74) *Attorney, Agent, or Firm* — Advent, LLP (57) ABSTRACT

An adaptive detector, such as a maximum a posteriori (MAP) detector for a read channel, is disclosed. In one or more embodiments, a data processing apparatus, such as a read channel digital front end, includes an equalizer configured to equalize X sample data to yield equalized Y sample data. A noise predictive filter configured to receive the equalized Y sample data yielded by the equalizer is operable to filter noise in the equalized Y sample data. A detector is configured to perform iterative data detection on the filtered equalized Y sample data. The detector is operable to program a branch metric, a variance, and a scaling factor for equalizer adaptation during a global iteration of the detector.

20 Claims, 3 Drawing Sheets

ADAPTIVE MAXIMUM A POSTERIORI (MAP) DETECTOR IN READ CHANNEL

BACKGROUND

Various data processing systems have been developed including storage systems, cellular telephone systems, and radio transmission systems. In such systems, data is transferred from a sender to a receiver via a medium. For example, in a storage system, data is sent from a sender (e.g., a write function) to a receiver (e.g., a read function) via a storage medium. As information is stored and transmitted in the form of digital data, errors are introduced that, if not corrected, can corrupt the data and render the information unusable. The effectiveness of any transfer is impacted by any losses in data caused by various factors.

Consequently, error correcting systems have been developed to detect and correct errors of digital data. For example, Inter-Symbol Interference (ISI) caused by the overlap of information pulses when magnetic transitions in a hard disk drive (HDD) are written too close together can introduce errors in data read from the HDD. Consequently, read channels used in HDDs account for ISI by employing Partial Response Maximum Likelihood (PRML) techniques that use equalization circuits to shape the signal from the read head of the HDD into a mathematical form called a target polynomial, which describes how much each bit overlaps into adjacent bits. Target polynomials are generally programmable and are chosen so that noise in the final equalized signal is uncorrelated from bit to bit. Under this condition, a Viterbi detector is used to find the most likely bit sequence or path that would have generated the read signal through use of a least-squared error metric. In this manner, the read channel accounts for ISI, allowing linear density to be increased.

SUMMARY

An adaptive detector, such as a maximum a posteriori (MAP) detector for a read channel, is disclosed. In one or more embodiments, the adaptive detector is implemented in a data processing apparatus such as a read channel digital front end, and so forth. The data processing apparatus includes an equalizer configured to equalize sample data to yield equalized sample data. A noise predictive filter configured to receive the equalized sample data yielded by the equalizer is operable to filter noise in the equalized sample data. A detector is configured to perform iterative data detection on the filtered equalized sample data. The detector is operable to program a branch metric, a variance, and a scaling factor for equalizer adaptation during a global iteration of the detector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures indicate similar or identical items.

DETAILED DESCRIPTION

Figure 1:
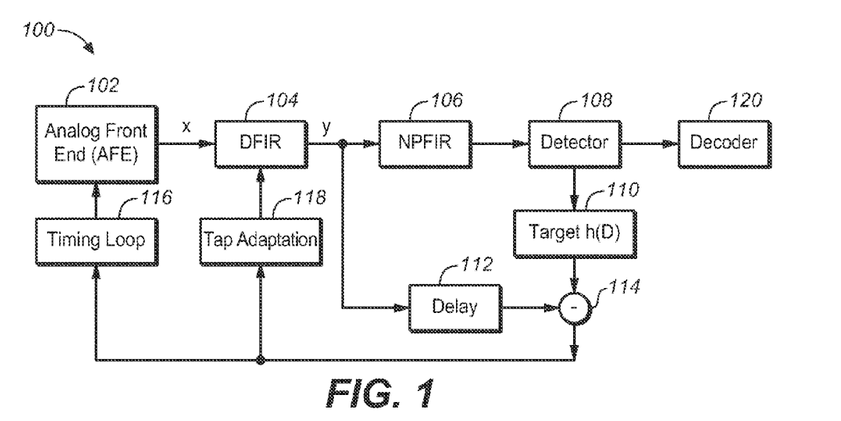
FIG. 1 is a block diagram that illustrates a data processing apparatus, such as a read channel digital front end, that employs an adaptive MAP detector in accordance with an embodiment of the disclosure.

FIG. 1 illustrates a data processing apparatus (a read channel digital front end 100 is shown by way of example) that employs an adaptive detector, such as a maximum a posteriori (MAP) detector, in accordance with an embodiment of the disclosure. The adaptive MAP detector is operable to program a branch metric (y ideal), a variance, and a scaling factor for equalizer adaptation during a global iteration of the detector. Read channels implementing the adaptive MAP detector are applicable to storage of information on virtually any media and/or transmission of information over virtually any channel. Storage applications include, but are not limited to: hard disk drives, compact disks, digital video disks, magnetic tapes and memory devices such as DRAM, NAND flash, NOR flash, other non-volatile memories and solid state drives. Transmission applications include, but are not limited to: optical fiber, radio frequency channels, wired or wireless local area networks, digital subscriber line technologies, wireless cellular, Ethernet over any medium such as copper or optical fiber, cable channels such as cable television, and Earth-satellite communications.

As shown in FIG. 1, the read channel digital front end 100 includes an analog front end 102 that receives and processes an analog signal from a storage or transmission channel. In embodiments, the analog front end 102 includes, but is not necessarily limited to: an analog filter or an amplifier circuit. For example, in an embodiment, the analog front end 102 includes a high pass filter, a variable gain amplifier (VGA), a compensation circuit for the magneto-resistive asymmetry (MRA) characteristic of a magnetic write head, and so forth. In some embodiments, the gain of a variable gain amplifier and the cutoff frequency and boost of an analog filter included in the analog front end 102 are modifiable.

In various embodiments, the analog signal is derived from a variety of sources. For example, in some embodiments, the analog signal is derived from a read/write head assembly in a storage or transmission channel that is disposed in relation to a storage medium. In other embodiments, the analog signal is derived from a receiver circuit in a storage or transmission channel that is operable to receive a signal from a transmission medium. In various embodiments, the transmission medium is wireless or wired and includes, but is not necessarily limited to: cable or optical connectivity. Other examples are possible.

The analog front end 102 includes an analog to digital converter (ADC) that converts the processed analog signal into a corresponding series of digital sample data or X samples. In embodiments, the analog to digital converter (ADC) comprises a circuit that is capable of producing digital sample data corresponding to an analog input signal. It will be appreciated that a variety of analog to digital converters (ADCs) are employed by different embodiments of the read channel digital front end. It is further contemplated that, in embodiments, the digital sample data (X samples) is obtained directly from a digital storage device or digital transmission medium, without the use of an analog to digital converter (ADC).

The digital sample data (X samples) is provided to an equalizer 104. The equalizer 104 applies an equalization algorithm to the digital sample data (X samples) to yield equalized sample data or Y samples. In embodiments, the equalizer 104 comprises a digital finite impulse response (DFIR) filter circuit. However, other embodiments are contemplated. In embodiments, the equalized digital sample data (Y samples) is stored in a Y memory or Y buffer (not shown) for processing by the read channel 100 (e.g., the detector 108) as discussed below.

The equalized digital sample data (Y samples) is provided to a noise prediction filter 106. The noise prediction filter 106 is configured to filter noise in the equalized digital sample data (Y samples). The combination of the equalizer (DFIR) 104 and the noise predictive filter (NPFIR) 106 has the effect of channel equalization of the digital sample data (X samples) so that the overall channel is a five (5)-tap signal dependent, partial response channel, which reduces inter-symbol interference (ISI), and suppresses channel noise to improve performance of the detector 108.

The detector 108 is operable to perform an iterative data detection process on the filtered equalized sample data (Y samples). The filtered equalized digital sample data from the noise prediction filter 108 is utilized by the detector 108 for equalizer tap adaptation to determine equalizer coefficients (e.g., DFIR tap coefficients) for the equalizer 104. The detector 108 programs a branch metric (y ideal), a variance, and a scaling factor for equalizer adaptation during a global iteration of the detector as described herein below in the discussion of FIGS. 2 and 3.

In embodiments, the detector 108 comprises a maximum a posteriori (MAP) data detector. However, it is contemplated that, in embodiments, the maximum a posteriori (MAP) data detector employs other maximum a posteriori (MAP) detection algorithms or detector circuits or variations thereof including, but not limited to: simplified maximum a posteriori (MAP) data detection algorithms and max-log maximum a posteriori (MAP) data detection algorithms, or corresponding detector circuits. In other embodiments, the detector 108 comprises a Viterbi algorithm data detector circuit, such as a Soft-Output Viterbi (SOVA) algorithm data detector circuit. However, it is contemplated that, in embodiments, the Viterbi algorithm data detector circuit comprises a Viterbi detection algorithm or Viterbi algorithm detector circuit or variations thereof including, but not limited to: bi-direction Viterbi detection algorithms or bi-direction Viterbi algorithm detector circuits.

As shown in FIG. 1, the detector 108 outputs a partial response target (h(D)) 110, which, in embodiments, is a two (2)-tap or three (3)-tap partial response target (e.g., h(D)=h[0]+h[1]D+h[2]D$^2$). The partial response target (h(D)) 110 is compared to equalized digital sample data (Y samples) from the equalizer 104 (e.g., the equalized digital sample data (Y samples) which are passed through delay 212 are subtracted from the partial response target (h(D)) 110 by subtractor 114), and used to control timing of the analog front end (AFE) 102 via timing loop 116 and for equalizer tap adaptation 118.

Upon completion, the detector 108 provides detected output. The detected output includes soft data. Herein, the term "soft data" is used in its broadest sense to mean reliability data with each occurrence of the reliability data indicating likelihood that a corresponding bit position or group of bit positions has been correctly detected. In some embodiments, the soft data or reliability data comprise log likelihood ratio data. The detected output is provided to a decoder 120 for decoding. The decoder 120 applies a data decode algorithm to the detected output. In embodiments, the decoder 120 comprises any type of decoder circuit including binary and no-binary, layered and non-layered. In embodiments, the decoder 120 comprises a low density parity check (LDPC) decoder circuit. In some embodiments, the detected output is also interleaved in a local interleaver circuit (not shown) to shuffle sub-portions (i.e., local chunks) of the data set included as detector output, and stored in a central memory (not shown).

Figure 2:
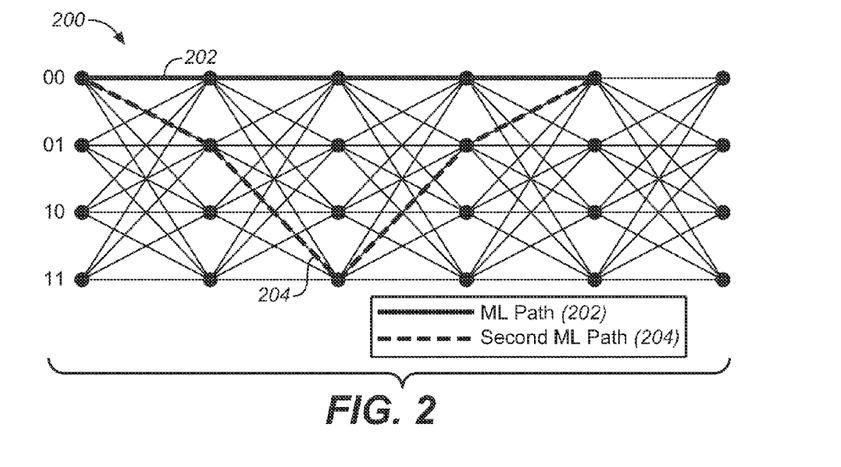
FIG. 2 is a diagrammatic illustration depicting path metrics of a Viterbi detector in accordance with an embodiment of the disclosure.

FIG. 2 illustrates example path metrics 200 determined by a Viterbi detector of an adaptive detector in accordance with embodiments of the disclosure, such as the adaptive MAP detector 100 shown in FIG. 1. The Viterbi detector is operable to find the maximum likelihood (ML) sequence (path) for a given input of filtered equalized sample data (Y samples). As shown, the Viterbi detector finds a first ML sequence (e.g., ML path 202) and a second ML sequence (e.g., second ML path 204). The detector then determines the difference between second ML sequence (second ML path 204) and the ML sequence (ML path 202), delta ($\Delta$), which is used as the error magnitude to evaluate the accuracy of the ML sequence (path) determination of the detector 108. In embodiments, delta ($\Delta$) is determined from Equation 1, below:

$$\Delta = P_{SML} - P_{ML} = \sum_{i=0}^{D} \frac{(y_i - \overline{y}_{i,j}^{(t)})^2 + \text{extrinsic} \times \text{vscale\_llr}^{(t)}}{2\sigma_{i,j}^{(t)2}} - \sum_{i=0}^{D} \frac{(y_i - \overline{y}_{i,k}^{(t)})^2 + \text{extrinsic} \times \text{vscale\_llr}^{(t)}}{2\sigma_{i,k}^{(t)2}} \quad \text{EQN. 1}$$

Where $P_{ML}$ and $P_{SML}$ represent the path metrics of the ML path 202 and second ML path 204, respectively. Since the path metrics value of the ML path 202 is smaller than the path metrics value of the second ML path 204, the value of delta ($\Delta$) is positive. D represents the path depth. In the embodiment shown in FIG. 2, the path depth is four (4). However, in other embodiments, other path depths are contemplated. $y_i$ represents the equalizer output at time index i. $\overline{y}_{i,j}^{(t)}$ represents the desired branch metric value of the t th iteration for branch metric j at time index i corresponding to the second ML sequence (second ML path 204). $\overline{y}_{i,k}^{(t)}$ represents the desired branch metric value of the t th iteration for branch metric k at time index i corresponding to the ML sequence (ML path 202). extrinsic represents the extrinsic information from the decoder (e.g., decoder 120). vscale_llr$^{(t)}$ represents the scaling factor of the t th iteration. $\sigma_{i,j}^{(t)2}$ represents the variance for branch metric j at time index i of the t th iteration. $\sigma_{i,k}^{(t)2}$ represents the variance for branch metric k at time index i of the t th iteration. j and k are indexes of the branch metrics, which have the from 0 to M−1 where M represents the number of states of the detector.

A pre-determined (e.g., pre-known) data pattern is employed by the detector for channel training Consequently, the detector output is known, or is determined. Thus, according to the pre-determined data pattern, a determination is made by the detector whether ML path 202 is the correct path.

$$P_{ML} = P_{ML} + \eta \times \Delta_e$$

$$P_{SML} = P_{SML} - \eta \times \Delta_e$$

$$\text{where } \Delta_e = \begin{cases} +\Delta & P_{ML} \text{ is incorrect path} \\ -\Delta & P_{ML} \text{ is correct path} \end{cases}$$

Figure 3:
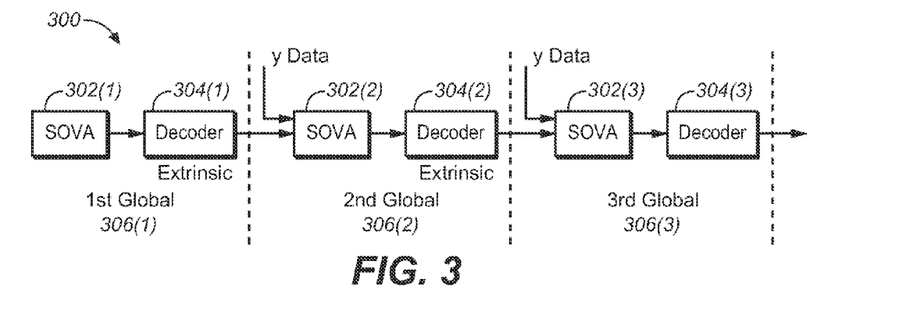
FIG. 3 is a block diagram illustrating iterations of the adaptive MAP detector in accordance with an embodiment of the disclosure

The detector programs branch metrics (y ideal ($\bar{y}_i$)), the variance ($\sigma_i^2$), and the scaling factor (vscale_llr) during each global iteration, and makes the equalizer adaptation. FIG. 3 illustrates programming of the detector (SOVA) 302 based on decoded data from the decoder 304 and equalized digital sample data or Y samples (y data), where the detector (SOVA) 302 includes three (3) parallel detectors (e.g., MAP1, MAP2, and MAP3). FIG. 3 depicts three (3) global iterations 306(1), 306(2), 306(3) of the detector (SOVA) 302(1), 302(2), 302(3) and decoder 304(1), 304(2).

The update error gradient ($\epsilon$) is derived in Equation 2, below:

$$\varepsilon = \Delta_e^2 = \Delta^2 = \left( \sum_{i=0}^{D} \frac{(y_i - \bar{y}_{i,j}^{(t)})^2 + \text{extrinsic} \times \text{vscale\_llr}_{i,j}^{(t)}}{2\sigma_{i,j}^{(t)2}} - \sum_{i=0}^{D} \frac{(y_i - \bar{y}_{i,k}^{(t)})^2 + \text{extrinsic} \times \text{vscale\_llr}_{i,k}^{(t)}}{2\sigma_{i,k}^{(t)2}} \right)^2 \quad \text{EQN. 2}$$

Since the values of the branch metric are not changed when the time index is changed, the time index of $\bar{y}_{i,j}^{(t)}$ or $\bar{y}_{i,k}^{(t)}$ in Equation 2 is dropped to yield $\bar{y}_j^{(t)}$ or $\bar{y}_k^{(t)}$, respectively. Similarly, variance term of Equation 2, $\sigma_{i,j}^{(t)}$ or $\sigma_{i,k}^{(t)}$, is simplified to $\sigma_j^{(t)}$ or $\sigma_k^{(t)}$, respectively. For the scaling factor of Equation 2, vscale_llr$_{i,j}^{(t)}$ and vscale_llr$_{i,k}^{(t)}$ is simplified to vscale_llr$_j^{(t)}$ or vscale_llr$_k^{(t)}$.

Equation 2 is thus rewritten as Equation 3, below:

$$\varepsilon = \Delta_e^2 = \Delta^2 = \left( \sum_{i=0}^{D} \frac{(y_i - \bar{y}_j^{(t)})^2 + \text{extrinsic} \times \text{vscale\_llr}_j^{(t)}}{2\sigma_j^{(t)2}} - \sum_{i=0}^{D} \frac{(y_i - \bar{y}_k^{(t)})^2 + \text{extrinsic} \times \text{vscale\_llr}_k^{(t)}}{2\sigma_k^{(t)2}} \right)^2 \quad \text{EQN. 3}$$

The error gradient for the detector branch metrics is:

$$\frac{\partial \varepsilon}{\partial \bar{y}_j^{(t)}} = 2\Delta \times \frac{\partial \Delta}{\partial \bar{y}_j^{(t)}} = -4\Delta \times v_j \times (y_i - \bar{y}_j^{(t)}) \quad \text{EQN. 4}$$

$$\frac{\partial \varepsilon}{\partial \bar{y}_k^{(t)}} = 2\Delta \times \frac{\partial \Delta}{\partial \bar{y}_k^{(t)}} = 4\Delta \times v_k \times (y_i - \bar{y}_k^{(t)}) \quad \text{EQN. 5}$$

Accordingly, when the detector determines that $P_{ML}$ is the incorrect ML path, the branch metrics (e.g., y ideal ($\bar{y}_i$)) are programmed (updated) as:

$$\bar{y}_j^{(t)}(n+1) = \bar{y}_j^{(t)}(n) - \eta \times \frac{\partial \varepsilon}{\partial \bar{y}_j^{(t)}} = \bar{y}_j^{(t)}(n) + \eta \times 4\Delta \times v_j \times (y_i - \bar{y}_j^{(t)}) \quad \text{EQN. 6}$$

$$\bar{y}_k^{(t)}(n+1) = \bar{y}_k^{(t)}(n) - \eta \times \frac{\partial \varepsilon}{\partial \bar{y}_k^{(t)}} = \bar{y}_k^{(t)}(n) - \eta \times 4\Delta \times v_k \times (y_i - \bar{y}_k^{(t)}) \quad \text{EQN. 7}$$

However, when the detector determines that $P_{ML}$ is the correct ML path, the branch metrics (e.g., y ideal ($\bar{y}_i$)) are programmed (updated) as:

$$\bar{y}_j^{(t)}(n+1) = \bar{y}_j^{(t)}(n) + \eta \times \frac{\partial \varepsilon}{\partial \bar{y}_j^{(t)}} = \bar{y}_j^{(t)}(n) - \eta \times 4\Delta \times v_j \times (y_i - \bar{y}_j^{(t)}) \quad \text{EQN. 8}$$

$$\bar{y}_k^{(t)}(n+1) = \bar{y}_k^{(t)}(n) + \eta \times \frac{\partial \varepsilon}{\partial \bar{y}_k^{(t)}} = \bar{y}_k^{(t)}(n) + \eta \times 4\Delta \times v_k \times (y_i - \bar{y}_k^{(t)}) \quad \text{EQN. 9}$$

Letting $$v_j^{(t)} = \frac{1}{2\sigma_j^{(t)2}} \text{ and } v_k^{(t)} = \frac{1}{2\sigma_k^{(t)2}}$$

The error gradient for the detector variance ($\sigma_i^2$) is:

$$\frac{\partial \varepsilon}{\partial v_j^{(t)}} = 2\Delta \times \frac{\partial \Delta}{\partial v_j^{(t)}} = 4\Delta \times (y_i - \bar{y}_j^{(t)})^2 \quad \text{EQN. 10}$$

$$\frac{\partial \varepsilon}{\partial v_k^{(t)}} = 2\Delta \times \frac{\partial \Delta}{\partial v_k^{(t)}} = -4\Delta \times (y_i - \bar{y}_k^{(t)})^2 \quad \text{EQN. 11}$$

Accordingly, when the detector determines that $P_{ML}$ is the incorrect ML path, the variance ($\sigma_i^2$) is programmed (updated) as:

$$v_j^{(t)}(n+1) = v_j^{(t)}(n) - \eta \times \frac{\partial \varepsilon}{\partial v_j^{(t)}} = v_j^{(t)}(n) - \eta \times 4\Delta \times (y_i - \bar{y}_j^{(t)})^2 \quad \text{EQN. 12}$$

$$v_k^{(t)}(n+1) = v_k^{(t)}(n) - \eta \times \frac{\partial \varepsilon}{\partial v_k^{(t)}} = v_k^{(t)}(n) + \eta \times 4\Delta \times (y_i - \bar{y}_k^{(t)})^2 \quad \text{EQN. 13}$$

However, when the detector determines that $P_{ML}$ is the correct ML path, the variance ($\sigma_i^2$) is programmed (updated) as:

$$v_j^{(t)}(n+1) = v_j^{(t)}(n) + \eta \times \frac{\partial \varepsilon}{\partial v_j^{(t)}} = v_j^{(t)}(n) + \eta \times 4\Delta \times (y_i - \bar{y}_j^{(t)})^2 \quad \text{EQN. 14}$$

$$v_k^{(t)}(n+1) = v_k^{(t)}(n) + \eta \times \frac{\partial \varepsilon}{\partial v_k^{(t)}} = v_k^{(t)}(n) - \eta \times 4\Delta \times (y_i - \bar{y}_k^{(t)})^2 \quad \text{EQN. 15}$$

The error gradient for the scaling factor (vscale_llr) is:

$$\frac{\partial \varepsilon}{\partial \text{vscale\_llr}_j^{(t)}} = 2\Delta \times \frac{\partial \Delta}{\partial \text{vscale\_llr}_j^{(t)}} = 2\Delta \times v_j^{(t)} \times \text{extrinsic} \quad \text{EQN. 16}$$

$$\frac{\partial \varepsilon}{\partial \text{vscale\_llr}_k^{(t)}} = -2\Delta \times \frac{\partial \Delta}{\partial \text{vscale\_llr}_k^{(t)}} = -2\Delta \times v_k^{(t)} \times \text{extrinsic} \quad \text{EQN. 17}$$

Accordingly, when the detector determines that $P_{ML}$ is the incorrect ML path, the scaling factor (vscale_llr) is programmed (updated) as:

$$\text{vscale\_llr}_j^{(t)}(n+1) = \text{vscale\_llr}_j^{(t)}(n) - \eta \times \frac{\partial \varepsilon}{\partial \text{vscale\_llr}_j^{(t)}} \quad \text{EQN. 18}$$
$$= \text{vscale\_llr}_j^{(t)}(n) - \eta \times 2\Delta \times v_j^{(t)} \times \text{extrinsic}$$

$$\text{vscale\_llr}_k^{(t)}(n+1) = \text{vscale\_llr}_k^{(t)}(n) - \eta \times \frac{\partial \varepsilon}{\partial \text{vscale\_llr}_k^{(t)}} \quad \text{EQN. 19}$$
$$= \text{vscale\_llr}_k^{(t)}(n) + \eta \times 2\Delta \times v_k^{(t)} \times \text{extrinsic}$$

However, when the detector determines that $P_{ML}$ is the correct ML path, the scaling factor (vscale_llr) is programmed (updated) as:

$$\text{vscale\_llr}_j^{(t)}(n+1) = \text{vscale\_llr}_j^{(t)}(n) + \eta \times \frac{\partial \varepsilon}{\partial \text{vscale\_llr}_j^{(t)}} \quad \text{EQN. 20}$$
$$= \text{vscale\_llr}_j^{(t)}(n) + \eta \times 2\Delta \times v_j^{(t)} \times \text{extrinsic}$$

$$\text{vscale\_llr}_k^{(t)}(n+1) = \text{vscale\_llr}_k^{(t)}(n) + \eta \times \frac{\partial \varepsilon}{\partial \text{vscale\_llr}_k^{(t)}} \quad \text{EQN. 21}$$
$$= \text{vscale\_llr}_k^{(t)}(n) - \eta \times 2\Delta \times v_k^{(t)} \times \text{extrinsic}$$

Thus, the Viterbi detector shown in FIG. 3 programs a different branch metric (y ideal $\bar{y}_i$), variance ($\sigma_i^2$), and scaling factor (vscale_llr), and the equalizer adapted separately for each global iteration. However, it is contemplated that, in some embodiments, the value of delta ($\Delta$) varies. When delta ($\Delta$) is small, the detector (e.g., detector 108 of FIG. 1) is more likely to be making errors in detection. Consequently, it is also contemplated that, in embodiments, delta ($\Delta$) is compared to a threshold ($D_{threshold}$), such as a programmable triggering threshold, and the branch metric (y ideal $\bar{y}_i$), variance ($\sigma_i^2$) and scaling factor (vscale_llr) programmed (e.g., the above equations for branch metric (y ideal $\bar{y}_i$), variance ($\sigma_i^2$), and scaling factor (vscale_llr) updated) when the detector 108 (FIG. 1) determines that delta ($\Delta$) is less than the threshold ($D_{threshold}$). Thus, when delta ($\Delta$) is less than a programmed threshold $D_{threshold}$), the branch metric (y ideal $\bar{y}_i$), variance ($\sigma_i^2$) and scaling factor (vscale_llr) programmed (e.g., the above equations for branch metric (y ideal $\bar{y}_i$), variance ($\sigma_i^2$), and scaling factor (vscale_llr) are updated).

Figure 4:
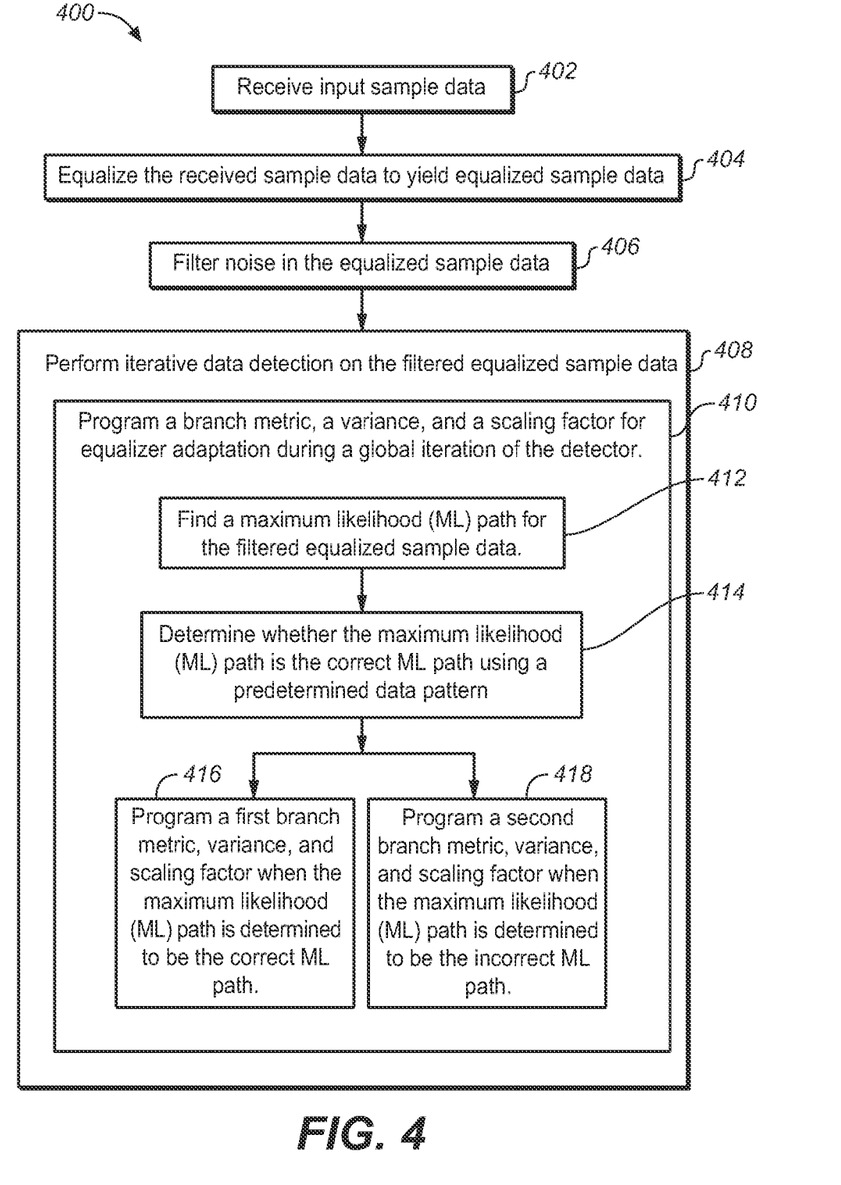
FIG. 4 is a flow diagram that illustrates a method in embodiments that is employed by an adaptive MAP detector, such as the adaptive MAP detector shown in FIG. 1, to furnish equalizer adaptation.

FIG. 4 illustrates a procedure (e.g., method, process, etc.) 400 in an embodiment of the disclosure that is employed by an adaptive MAP detector, such as the adaptive MAP detector of the read channel front end shown in FIG. 1, to furnish equalizer adaptation. As shown, input sample data is received (Block 402). For example, in the embodiment shown in FIG. 1, digital sample data (X samples) are provided to equalizer 114 of the data-dependent equalizer circuit 102 (e.g., by an analog to digital converter (ADC) 110). However, it is contemplated that, in other embodiments, the digital sample data (X samples) 112 is obtained directly from a digital storage device or digital transmission medium, without the use of an analog to digital converter (ADC) 110.

The received sample data is equalized to yield equalized sample data (Block 404). For example, as shown in FIG. 1, the digital sample data (X samples) is provided to an equalizer 104. The equalizer 104 applies an equalization algorithm to the digital sample data (X samples) to yield equalized sample data or Y samples. In embodiments, the equalizer 104 comprises a digital finite impulse response (DFIR) filter circuit. However, other embodiments are contemplated.

Noise is filtered in the equalized sample data (Block 406). For example, as shown in FIG. 1, the equalized digital sample data (Y samples) is provided to a noise prediction filter 106. The noise prediction filter 106 is configured to filter noise in the equalized digital sample data (Y samples). The combination of the equalizer (DFIR) 104 and the noise predictive filter (NPFIR) 106 has the effect of channel equalization of the digital sample data (X samples) so that the overall channel is a five (5)-tap signal dependent, partial response channel, which reduces inter-symbol interference (ISI), and suppresses channel noise to improve performance of the detector 108.

Iterative data detection is then performed on the filtered equalized sample data (Block 408). For example, as shown in FIG. 1, the filtered equalized sample data (Y samples) is passed to a detector (e.g., maximum a posteriori (MAP) detector) 108 that is operable to perform an iterative data detection process on the data (Y samples). The filtered equalized digital sample data from the noise prediction filter 108 is utilized by the detector 108 for equalizer tap adaptation to determine equalizer coefficients (e.g., DFIR tap coefficients) for the equalizer 104.

During data detection, a branch metric, a variance, and a scaling factor is programmed for equalizer adaptation during a global iteration of the detector (Block 410). For example, in the embodiment shown in FIG. 2, the detector 108 programs branch metrics (y ideal ($\bar{y}_i$)), the variance ($\sigma_i^2$), and the scaling factor (vscale_llr) during a global iteration of the detector as described hereinabove in the discussion of FIGS. 2 and 3. Thus, in embodiments, a maximum likelihood (ML) path is found for the filtered equalized sample data (Block 412). For example, in embodiments, a Viterbi detector is employed to find the maximum likelihood (ML) sequence (path) for a given input of filtered equalized sample data (Y samples). As shown in FIG. 2, the Viterbi detector finds a first ML sequence (e.g., ML path 202) and a second ML sequence (e.g., second ML path 204). The detector then determines the difference between the second ML sequence (second ML path 204) and the ML sequence (ML path 202), delta ($\Delta$), which is used as the error magnitude to evaluate the accuracy of the ML sequence (path) determination of the detector 108. In embodiments, delta ($\Delta$) is determined from Equation 1 above.

A determination is then made whether the maximum likelihood (ML) path is the correct ML path using a predetermined data pattern (Block 414) For example, as described in the discussion of FIG. 2, a pre-determined (e.g., pre-known) data pattern is employed by the detector for channel training Consequently, the detector output is known, or is determined. Thus, a determination is made by the detector whether ML path 202 is the correct path as discussed above.

When a determination is made that the maximum likelihood (ML) path is the correct ML path, a first branch metric, variance, and scaling factor is programmed (Block 416). For example, as described in the discussion of FIGS. 2 and 3, when the detector determines that $P_{ML}$ is the correct ML path, the branch metrics (e.g., y ideal ($\bar{y}_i$)) are programmed (updated) using Equations 8 and 9, above; while the variance ($\sigma_i^2$) is programmed (updated) using Equations 14 and 15, above; and the scaling factor (vscale_llr) is programmed (updated) using Equations 20 and 21, above.

However, when a determination is made that the maximum likelihood (ML) path is the incorrect ML path, a second branch metric, variance, and scaling factor are programmed (Block 418). For example, as described in the discussion of FIGS. 2 and 3, when the detector determines that $P_{ML}$ is the correct ML path, the branch metrics (e.g., y ideal ($\bar{y}_i$)) are programmed (updated) using Equations 6 and 7, above; while the variance ($\sigma_i^2$) is programmed (updated) using Equations 12 and 13, above; and the scaling factor (vscale_llr) is programmed (updated) using Equations 20 and 21, above.

The Viterbi detector shown in FIG. 2 programs a different branch metric (y ideal $\bar{y}_i$), variance ($\sigma_i^2$), and scaling factor (vscale_llr), and the equalizer adapted separately for each global iteration. However, it is contemplated that, in some embodiments, the value of delta ($\Delta$) varies. When delta ($\Delta$) is small, the detector (e.g., detector 108 of FIG. 1) is more likely to be making errors in detection. Consequently, it is also contemplated that, in embodiments, delta ($\Delta$) is compared to a threshold ($D_{threshold}$), such as a programmable triggering threshold, and the branch metric (y ideal $\bar{y}_i$), variance ($\sigma_i^2$), and scaling factor (vscale_llr) programmed (e.g., the above equations for branch metric (y ideal $\bar{y}_i$), variance ($\sigma_i^2$), and scaling factor (vscale_llr) updated) when the detector 108 (FIG. 1) determines that delta ($\Delta$) is less than the threshold ($D_{threshold}$). Thus, when delta ($\Delta$) is less than a programmed threshold ($D_{threshold}$), the branch metric (y ideal $\bar{y}_i$), variance ($\sigma_i^2$), and scaling factor (vscale_llr) programmed (e.g., the above equations for branch metric (y ideal $\bar{y}_i$), variance ($\sigma_i^2$), and scaling factor (vscale_llr) are updated).

Figure 5:
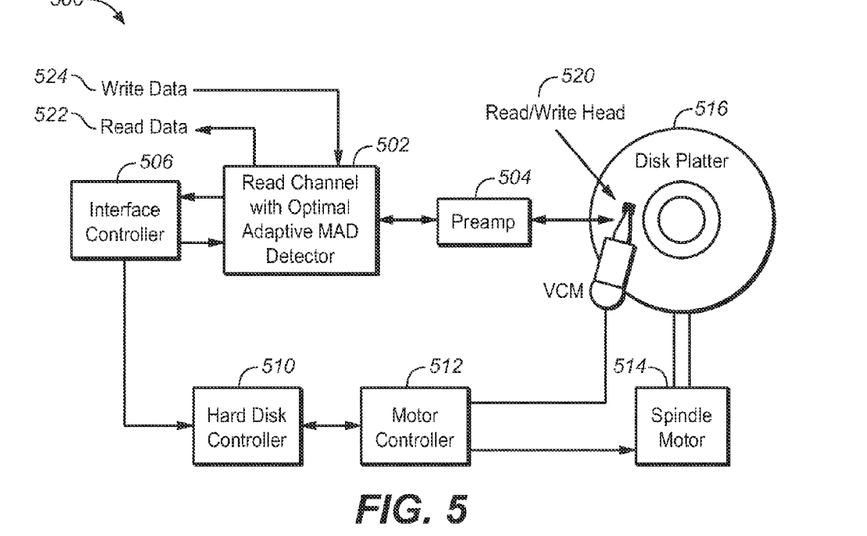
FIG. 5 is a block diagram that illustrates a storage system having a read channel that employs an adaptive MAP detector, such as the adaptive MAP detector shown in FIG. 1, in accordance with an embodiment of the disclosure.
Figure 6:
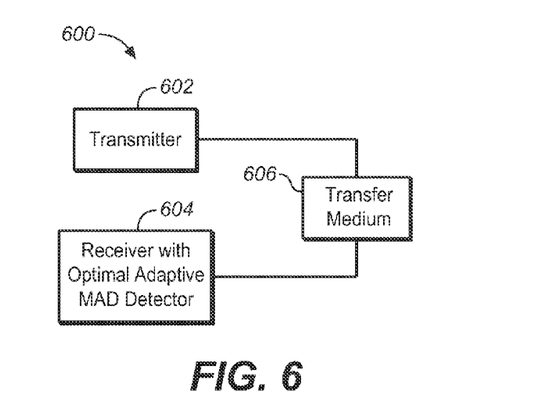
FIG. 6 is a block diagram that illustrates a wireless communication system having a receiver that employs an adaptive MAP detector, such as the adaptive MAP detector shown in FIG. 1, in accordance with an embodiment of the disclosure.

Although the adaptive MAP detector disclosed herein is not limited to any particular application, several examples of applications are presented in FIGS. 5 and 6. In FIG. 5, a storage system 500 is illustrated. The storage system 500 includes a read channel circuit 502 that employs an adaptive MAP detector in accordance with an embodiment of the disclosure, such as the adaptive MAP detector 108 of the read channel digital front end 100 shown in FIG. 1. In embodiments, the storage system 500 is, for example, a hard disk drive (HDD). As shown, the storage system 500 includes a preamplifier 504, an interface controller 506, a hard disk controller 510, a motor controller 512, a spindle motor 514, a disk platter 516, and a read/write head assembly 520. The interface controller 506 controls addressing and timing of data to/from the disk platter 516. The data on the disk platter 516 includes groups of magnetic signals that are detected by the read/write head assembly 520 when the assembly is properly positioned over disk platter 516. In one or more embodiments, the disk platter 516 includes magnetic signals recorded in accordance with either a longitudinal or a perpendicular recording scheme.

In a typical read operation, the read/write head assembly 520 is accurately positioned by the motor controller 512 over a desired data track on the disk platter 516. The motor controller 512 positions the read/write head assembly 520 in relation to the disk platter 516 and drives the spindle motor 514 by moving the read/write head assembly 520 to the proper data track on the disk platter 516 under the direction of the hard disk controller 510. The spindle motor 514 spins the disk platter 516 at a determined spin rate (e.g., at a determined number of revolutions per minute (RPM)). Once the read/write head assembly 520 is positioned adjacent the proper data track, magnetic signals representing data on the disk platter 516 are sensed by the read/write head assembly 520 as the disk platter 516 is rotated by the spindle motor 514. The sensed magnetic signals are provided as a continuous, minute analog signal representative of the magnetic data on the disk platter 516. This minute analog signal is transferred from the read/write head assembly 520 to the read channel circuit 502 via a preamplifier 504. The preamplifier 504 is operable to amplify the minute analog signals accessed from the disk platter 516. In turn, the read channel 502 decodes and digitizes the received analog signal to recreate the information originally written to the disk platter 516. This data is provided as read data 522 to a receiving circuit. As part of decoding the received information, the read channel 502 processes the received signal using the adaptive MAP detector 102 as described herein. A write operation is substantially the opposite of the preceding read operation with write data 524 being provided to the read channel 502. This data is then encoded and written to the disk platter 516.

It should be noted that, in embodiments, the storage system 500 is integrated into a larger storage system such as, for example, a RAID (redundant array of inexpensive disks or redundant array of independent disks) based storage system. RAID storage systems increase stability and reliability through redundancy, combining multiple disks as a logical unit. In this manner, data is spread across a number of disks included in the RAID storage system according to a variety of algorithms and accessed by an operating system as if the RAID storage system were a single disk drive. For example, in embodiments, data is mirrored to multiple disks in the RAID storage system, or sliced and distributed across multiple disks using a number of techniques. If a small number of disks in the RAID storage system fail or become unavailable, error correction techniques are used to recreate the missing data based on the remaining portions of the data from the other disks in the RAID storage system. In embodiments, the disks in the RAID storage system include, but are not limited to: individual storage systems such as storage system 500, and are located in close proximity to each other or distributed more widely for increased security. In a write operation, write data is provided to a controller which stores the write data across the disks, for example, by mirroring or by striping the write data. In a read operation, the controller retrieves the data from the disks. The controller then yields the resulting read data as if the RAID storage system were a single disk drive.

FIG. 6 illustrates a wireless communication system 600 or data transmission device including a receiver 604 that employs an adaptive MAP detector in accordance with an embodiment of the disclosure, such as the adaptive MAP detector 108 shown in FIG. 1. The communication system 600 includes a transmitter 602 that is operable to transmit encoded information via a transfer medium 606. The encoded data is received from the transfer medium 606 by receiver 604. As part of the processing of the encoded data, the receiver 604 processes the received signal using an adaptive MAP detector 102 as described herein.

Generally, any of the functions described herein can be implemented using hardware (e.g., fixed logic circuitry such as integrated circuits), software, firmware, manual processing, or a combination of these embodiments. Thus, the blocks discussed in the above disclosure generally represent hardware (e.g., fixed logic circuitry such as integrated circuits), software, firmware, or a combination thereof. In the case of a hardware embodiment, for example, the various blocks discussed in the above disclosure can be implemented as integrated circuits along with other functionality. In embodiments, such integrated circuits include all of the functions of a given block, system or circuit, or a portion of the functions of the block, system or circuit. Further, in embodiments, elements of the blocks, systems, or circuits are implemented across multiple integrated circuits. Such integrated circuits include any type of integrated circuit including, but not necessarily limited to: a monolithic integrated circuit, a flip chip integrated circuit, a multichip module integrated circuit, and/or a mixed signal integrated circuit. In the case of a software embodiment, for example, the various blocks discussed in the above disclosure represent executable instructions (e.g., program code) that perform specified tasks when executed on a processor. In embodiments, these executable instructions are stored in one or more tangible computer readable media. In some such embodiments, the entire system, block or circuit is implemented using its software or firmware equivalent. In other embodiments, one part of a given system, block or circuit is implemented in software or firmware, while other parts are implemented in hardware.

Although the subject matter has been described in language specific to structural features and/or methodological acts, it is to be understood that the subject matter defined in the appended claims is not necessarily limited to the specific features or acts described. Although various configurations are discussed, the apparatus, systems, subsystems, components and so forth can be constructed in a variety of ways without departing from this disclosure. Rather, the specific features and acts are disclosed as example forms of implementing the claims.

What is claimed is:

1. A data processing apparatus, comprising:
an equalizer configured to equalize sample data to yield equalized sample data;
a noise predictive filter configured to receive the equalized sample data yielded by the equalizer, the filter operable to filter noise in the equalized sample data;
a detector configured to perform iterative data detection on the filtered equalized sample data, the detector operable to program a branch metric, a variance, and a scaling factor for equalizer adaptation during a global iteration of the detector, the detector configured to yield a multi-tap partial response target;
delay circuitry configured to receive and delay the equalized sample data yielded by the equalizer; and
a comparator configured to receive the delayed equalized sample data yielded by the delay circuitry and the multi-tap partial response target yielded by the detector, the comparator configured to compare the delayed equalized sample data to the multi-tap partial response target, the output of the comparator coupled with the equalizer for tap adaptation.

2. The data processing apparatus as recited in claim 1, wherein the detector comprises a maximum a posteriori (MAP) detector.

3. The data processing apparatus as recited in claim 2, wherein the detector is configured to find a maximum likelihood (ML) path for the filtered equalized sample data.

4. The data processing apparatus as recited in claim 3, wherein the detector is configured to determine whether the maximum likelihood (ML) path is the correct ML path using a predetermined data pattern, the detector configured to program a first branch metric, variance, and scaling factor when the maximum likelihood (ML) path is determined to be the correct maximum likelihood (ML) path, and a second branch metric, variance, and scaling factor when the maximum likelihood (ML) path is determined to be the incorrect maximum likelihood (ML) path.

5. The data processing apparatus as recited in claim 3, wherein the detector is configured to determine an error magnitude, the error magnitude comprising a difference between the maximum likelihood (ML) path and a second maximum likelihood (ML) path, and wherein the detector is operable to program a branch metric, a variance, and a scaling factor for equalizer adaptation during a global iteration of the detector when the error magnitude is less than a threshold error magnitude.

6. The data processing apparatus as recited in claim 2, wherein the detector is operable to program a branch metric, a variance, and a scaling factor for equalizer adaptation during each global iteration of the detector.

7. The data processing apparatus as recited in claim 2, wherein the noise predictive filter comprises a noise predictive finite impulse response (NPFIR) filter and the equalizer comprises a digital finite impulse response (DFIR) filter.

8. A method comprising:
receiving input sample data;
equalizing the received sample data to yield equalized sample data;
filtering noise in the equalized sample data; and
performing iterative data detection, using a detector, on the filtered equalized sample data to yield a multi-tap partial response target;
programming a branch metric, a variance, and a scaling factor for equalizer adaptation during a global iteration of the detector;
delaying the equalized sample data yielded by the equalizer;
comparing the delayed equalized sample data to the multi-tap partial response target; and
performing tap adaptation based upon the comparison of the delayed equalized sample data to the multi-tap partial response target.

9. The method as recited in claim 8, wherein the detector comprises a maximum a posteriori (MAP) detector.

10. The method as recited in claim 9, further comprising finding a maximum likelihood (ML) path for the filtered equalized sample data.

11. The method as recited in claim 10, further comprising:
determining whether the maximum likelihood (ML) path is the correct maximum likelihood (ML) path using a predetermined data pattern;
programming a first branch metric, variance, and scaling factor when the maximum likelihood (ML) path is determined to be the correct maximum likelihood (ML) path; and
programming a second branch metric, variance, and scaling factor when the maximum likelihood (ML) path is determined to be the incorrect maximum likelihood (ML) path.

12. The method as recited in claim 10, further comprising determining an error magnitude, the error magnitude comprising a difference between the maximum likelihood (ML) path and a second maximum likelihood (ML) path, and wherein the detector is operable to program a branch metric, a variance, and a scaling factor for equalizer adaptation during a global iteration of the detector when the error magnitude is less than a threshold error magnitude.

13. The method as recited in claim 8, wherein the detector is operable to program a branch metric, a variance, and a scaling factor for equalizer adaptation during each global iteration of the detector.

14. A storage system, comprising:
a storage medium configured to maintain a data set;
a read/write assembly operable to read the data set on the storage medium; and
a read channel having a data processing apparatus operable to correct errors in the data set read from the storage medium, comprising:
an analog front end configured to receive and process an analog signal from the read/write assembly to yield sample data;
an equalizer configured to receive the sample data yielded by the analog front end, the equalizer configured to equalize the sample data to yield equalized sample data;

a noise predictive filter configured to receive the equalized sample data yielded by the equalizer, the filter operable to filter noise in the equalized sample data;

a detector configured to perform iterative data detection on the filtered equalized sample data, the detector operable to program a branch metric, a variance, and a scaling factor for equalizer adaptation during a global iteration of the detector, the detector configured to yield a multi-tap partial response target;

delay circuitry configured to receive and delay the equalized sample data yielded by the equalizer;

a comparator configured to receive the delayed equalized sample data yielded by the delay circuitry and the multi-tap partial response target yielded by the detector, the comparator configured to compare the delayed equalized sample data to the multi-tap partial response target, the output of the comparator coupled with the equalizer for tap adaptation; and a timing loop coupled with the output of the comparator and configured to control timing of the analog front end based upon the comparison of the delayed equalized sample data to the multi-tap partial response target.

15. The storage system as recited in claim 14, wherein the detector comprises a maximum a posteriori (MAP) detector.

16. The storage system as recited in claim 15, wherein the detector is configured to find a maximum likelihood (ML) path for the filtered equalized sample data.

17. The storage system as recited in claim 16, wherein the detector is configured to determine whether the maximum likelihood (ML) path is the correct maximum likelihood (ML) path using a predetermined data pattern, the detector configured to program a first branch metric, variance, and scaling factor when the maximum likelihood (ML) path is determined to be the correct maximum likelihood (ML) path, and a second branch metric, variance, and scaling factor when the maximum likelihood (ML) path is determined to be the incorrect maximum likelihood (ML) path.

18. The storage system as recited in claim 16, wherein the detector is configured to determine an error magnitude, the error magnitude comprising a difference between the maximum likelihood (ML) path and a second maximum likelihood (ML) path, and wherein the detector is operable to program a branch metric, a variance, and a scaling factor for equalizer adaptation during a global iteration of the detector when the error magnitude is less than a threshold error magnitude.

19. The storage system as recited in claim 13, wherein the detector is operable to program a branch metric, a variance, and a scaling factor for equalizer adaptation during each global iteration of the detector.

20. The storage system as recited in claim 13, wherein the noise predictive filter comprises a noise predictive finite impulse response (NPFIR) filter and the equalizer comprises a digital finite impulse response (DFIR) filter.

* * * * *